United States Patent [19]

Coburn, Jr. et al.

[11] Patent Number: 4,463,870
[45] Date of Patent: Aug. 7, 1984

[54] CLOSURE PLATE FOR AN OPENING

[75] Inventors: John A. Coburn, Jr., Warren; Paul R. Shaw, Richmond, both of Mich.

[73] Assignee: L & L Products, Inc., Romeo, Mich.

[21] Appl. No.: 543,400

[22] Filed: Oct. 19, 1983

[51] Int. Cl.³ .............................................. B65D 39/00
[52] U.S. Cl. ..................................... 220/307; 220/352; 220/353
[58] Field of Search ............... 220/307, 352, 353, 233, 220/DIG. 19, 241; 174/66, 67

[56] References Cited

U.S. PATENT DOCUMENTS

| | | |
|---|---|---|
| Re. 30,326 | 7/1980 | van Buren, Jr. . |
| 3,672,532 | 6/1972 | Becker . |
| 3,675,958 | 7/1972 | Duffy . |
| 3,900,130 | 8/1975 | Andrews . |
| 3,944,107 | 3/1976 | Wallace et al. . |
| 3,990,604 | 11/1976 | Barnett et al. . |
| 4,037,754 | 7/1977 | Wilhelmi et al. . |
| 4,091,962 | 5/1978 | van Buren, Jr. . |
| 4,094,436 | 6/1978 | Birmingham . |
| 4,300,865 | 11/1981 | Murray . |
| 4,363,420 | 12/1982 | Andrews . |
| 4,391,384 | 7/1983 | Moore et al. ........................ 220/307 |
| 4,399,927 | 8/1983 | Yaotani et al. ...................... 220/307 |

OTHER PUBLICATIONS

Seven photographs showing various devices for covering and/or sealing an aperture in a panel structure, or for attachably securing an item to such a panel structure.

Primary Examiner—George T. Hall
Attorney, Agent, or Firm—Harness, Dickey & Pierce

[57] ABSTRACT

A device for at least partially closing or covering an aperture in a panel structure or the like generally includes a relatively stiff but malleable one-piece body including at least two or more integral attachment members extending generally in a lateral or radial outward direction. The outer ends of the attachment members support the remainder of the one-piece body in a generally arched configuration when loosely inserted into the aperture. When a force is exerted on the one-piece body generally toward the aperture at least a portion of the one-piece body bends so that the attachment members are forcibly spread outwardly into a secure gripping engagement with the portion of the panel structure surrounding the aperture. The closure device can also be used in conjunction with various sealing or adhesive bonding means, as well as with various other optional features of the invention.

41 Claims, 11 Drawing Figures

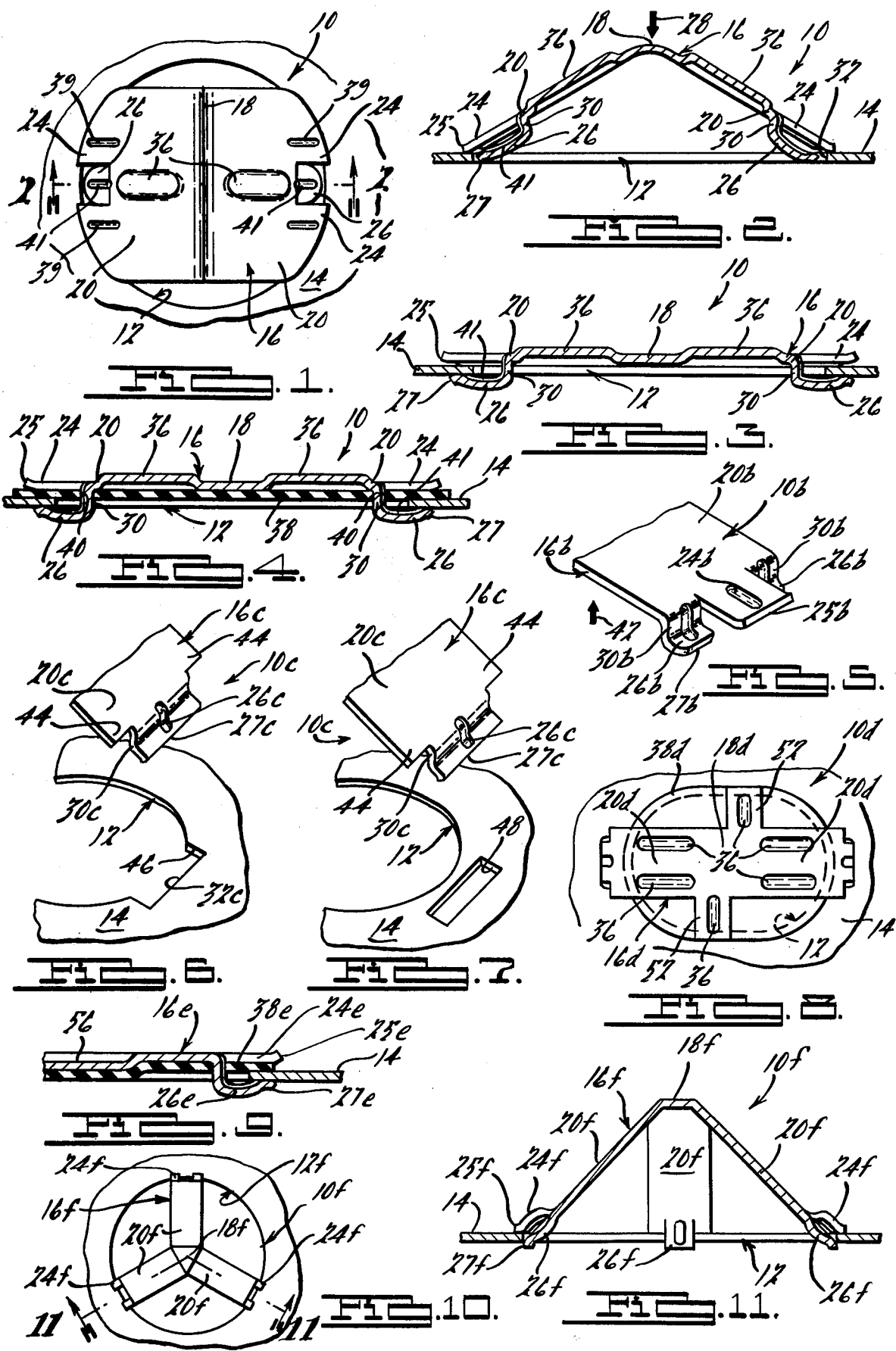

CLOSURE PLATE FOR AN OPENING

BACKGROUND AND SUMMARY OF THE INVENTION

The invention relates generally to aperture closure devices, such as covers, plugs, plates or the like, adapted for at least partially closing an aperture in a panel structure, underlying support member or the like. More particularly, the invention relates to one-piece closure devices that are preferably integrally formed from a sheet material such as sheet metal, for example, and that may be used to at least partially cover or close an aperture in a panel structure or the like, with or without a sealing member or gasket.

Frequently, various panel structures or other such members used in the manufacture of automobiles, refrigerators, freezers, or other products, are formed with apertures or openings therein. Such apertures are provided for such purposes as access to adjacent components during assembly, installation of insulating material, drain holes for paint or rust inhibitors, holes for engaging assembly line conveyor lugs, and a multitude of other purposes. Generally, such apertures are required or desired to be covered and/or sealed to prevent the entry of dirt, moisture, fumes and the like, or to prevent leakage or removal of internal materials therethrough.

Typically the above-described apertures are covered or closed by flat metal plates or similar covers secured to the panel structure by threaded fasteners, resilient fingers having complex shapes and barb-like projections, or multi-piece assemblies, many of which have generally been found to be relatively expensive and complex to manufacture, or relatively difficult and expensive to install. In addition, many of the conventional closure devices known in the art are of a complex shape or configuration, or have included legs or other portions thereof that have protruded excessively from the panel structures on the opposide side from the side in which they are installed and thus have interferred with other components or have been subject to being knocked out of their apertures by such other components. Furthermore, many of such prior closure devices have been found to be deficient in terms of their push-out or pull-out strength and have therefore been susceptible to being loosened or removed completely under normally-expected operating conditions of the apparatus in which they are installed. Accordingly, the need has arisen for a simple and inexpensive closure device adapted for partially or wholly closing an aperture in a panel structure or the like, which is easy and inexpensive to install, which may be used alone or in conjunction with simple and inexpensive sealing devices, which possesses the necessary push-out and pull-out strength to withstand the forces and pressures exerted thereon during normal conditions, and which preferably does not excessively protrude from the panel structure.

According to the present invention, a one-piece closure device for at least partially closing or covering an aperture in a panel structure or other member generally comprises a relatively stiff but malleable, one-piece body including a suitable number of integral outer attachment members. At least a portion of each of the outer attachment members is adapted to loosely and abuttingly engage a portion of the panel structure generally adjacent the aperture therein when the one-piece body is inserted into the aperture from a first side of the panel structure. The outer attachment members support the remainder of the one-piece body in a generally arched configured with at least a portion thereof spaced apart from the aperture on the first side of the panel structure.

Preferably, the outer attachment members are interconnected by a generally intermediate apex portion of the one-piece body and diverge toward the panel structure in an angular relationship with one another. At least the apex portion of the one-piece body is adapted to receive a force exerted generally in a direction toward the aperture, with the one-piece body deforming toward the aperture under the influence of such force so that the outer attachment members are forcibly spread or moved in a generally radial outward direction into a relatively tight gripping relationship with the panel structure. When forcibly urged into such gripping relationship with the portion of the panel structure surrounding the aperture, the attachment members preferably grip both the first side, and a second opposite side, of the panel structure at locations generally adjacent the aperture.

The one-piece body of the closure device according to the present invention is preferably fabricated from a relatively thin sheet material, such as a relatively rigid but malleable non-spring sheet metal for example, and the outer ends of the attachment members do not protrude or extend from the second opposite side of the panel structure an excessive distance, such distance generally not being substantially more than the thickness of the sheet material. In the preferred embodiments the entire one-piece body preferably protrudes a distance less than approximately three times the thickness of said sheet material from either of the first or second sides of the panel structure (or any part thereof).

The one-piece body of the closure device according to the present invention may be configured to cover substantially the entire aperture in the panel structure and may be used either alone, where a fluid-tight closure of the aperture is not required, or in conjunction with a sealing member or substance. Such sealing members or substances may be interposed in the annular region of overlap between the one-piece body and the surrounding panel structure, or they may extend across substantially the entire aperture in a plate-like configuration.

Alternatively, the one-piece body can be formed in a strap-like configuration adapted to only partially cover or close the aperture. Such strap-like closure devices, as well as any of the embodiments of the invention, can be used where only a partial blocking of the open aperture is required or where a plate-like sealing member covers substantially the entire aperture, and/or where the closure device is required to temporarily locate and support or stiffen the sealing member until the sealing member is heat activated, bonded, secured or set in place over the aperture. It should also be noted that the one piece body can be used to secure, attach or locate other components or members to the panel structure.

Additional alternate embodiments, objects, advantages and features of the present invention will become apparent from the following description and appended claims, taken in conjunction with the accompanying drawings.

BRIEF DESCRIPTION OF THE DRAWINGS

FIG. 1 is a plan view of an exemplary closure device according to the present invention loosely inserted into an aperture in a panel structure or the like.

FIG. 2 is a cross-sectional view taken along line 2—2 of FIG. 1.

FIG. 3 is a cross-sectional view similar to that of FIG. 2, but illustrating the one-piece body of the closure device in a generally flattened configuration in gripping engagement with the panel structure.

FIG. 4 is a cross-sectional view similar to FIG. 3, but illustrating the closure device according to the present invention in conjunction with a sealing member for forming a substantially fluid-tight closure of the aperture.

FIG. 5 is a partial perspective view of the one-piece body of a closure device similar to that of FIG. 1, but illustrating an alternate outer end configuration.

FIG. 6 is a perspective view of still another alternate embodiment of the closure device according to the present invention for use in conjunction with a panel structure having a slotted opening generally adjacent and in communication with the aperture in the panel structure.

FIG. 7 is a perspective view similar to that of FIG. 6, but illustrating the alternate closure device of FIG. 6 for use in conjunction with a panel structure having a slotted opening generally adjacent but separate from the aperture.

FIG. 8 is a plan view of still another alternate embodiment of the closure device according to the present invention used in conjunction with a plate-sealing member covering the entire aperture and with portions of the one-piece body extending in a generally lateral radial direction to support the sealing member.

FIG. 9 illustrates a cross-sectional view similar to that of FIG. 3, but illustrating still another alternate closure device according to the present invention including a recessed one-piece body portion configured to be installed in a substantially flush relationship with the panel structure.

FIG. 10 illustrates a plan view of still another alternate embodiment of the closure device according to the present invention wherein the one-piece body includes more than a pair of outer attachment members.

FIG. 11 is a cross-sectional view taken along line 11—11 of FIG. 10.

DETAILED DESCRIPTION OF THE PREFERRED EMBODIMENTS

FIGS. 1 through 11 illustrate various preferred embodiments of the closure device according to the present invention for purposes of illustrating the multitude of variations, optional features, and diverse applications of the present invention. One skilled in the art will readily recognize from the following description and the accompanying claims and drawings that the principles of the present invention are not limited to the various embodiments of closure devices depicted in the drawings.

FIGS. 1 through 4 illustrate one of the several variations on the preferred embodiments of an aperture closure device 10, according to the present invention, for at least partially closing an aperture 12 formed in a panel structure or the like 14. The closure device 10 generally includes a one-piece body 16 preferably integrally formed and configured to include a generally intermediate apex portion 18 interconnecting at least a pair of outer attachment members 20 extending in generally lateral or radial outward directions.

In the embodiment of the closure device 10 shown in FIGS. 1 through 4, the outer ends of each of the attachment members 20 include tabs 24 and 26 thereon, which are adapted to loosely and abuttingly engage a portion of the panel structure 14 generally adjacent the aperture 12 when the one-piece body 16 is loosely inserted into the aperture 12 from a first side thereof, as illustrated in FIG. 2. In such a loosely inserted condition, the attachment members 20 and the tabs 24 and 26 support the remainder of the one-piece body 16, or at least the apex portion 18, in a generally arched configuration spaced apart from the plane of the panel structure 14 and the open aperture 12.

Because of the generally arched configuration of the one-piece body 16, with its attachment members 20 diverging from the apex portion 18 toward the panel structure 14, a force may be exerted upon the apex portion 18 generally toward the aperture 12, as illustrated by force arrow 28 in FIG. 2, to bend and deform, or generally flatten, the one-piece body 16 toward the aperture 12. Such bending deformation, which is preferably primarily constrained to the apex portion 18, causes the attachment members 20 to be forcibly spread in a generally radial or lateral outward direction into a relatively tight gripping relationship with the portion of the panel structure 14 surrounding the aperture 12. It should be noted that in the embodiment illustrated in FIGS. 1 through 4, the lateral tabs 24 and 26 of the attachment members 20 grip the first and second opposite sides, respectively, of the panel structure 14.

The tabs 26 of the embodiment illustrated in FIGS. 1 through 4, as well as any of the other embodiments of the present invention, are preferably formed with a slightly arcuate configuration as shown in the drawings. Such configuration facilitates the relatively tight sliding engagement of the tabs 26 with the second opposite side of the panel structure 14, both during and after installation of the one-piece body 16, and also accommodates any flanges, burrs, or other protrusions of the panel structure. In this regard, both the tabs 24 and 26 are preferably equipped with lip portions 25 and 27, respectively, that are slightly curved or angled away from the panel structure. Such lip portions 25 and 27 allow the tabs 24 and 26, respectively, to slidingly engage the panel structure 14 without abrading or "digging into" the panel structure surface. Preferably, however, the tabs 26 grip the second opposite side of the panel structure in a relatively tight and flush relationship therewith so that they protrude from the second opposite side of the panel structure (or any flanges, burrs, etc., thereof) generally not substantially more than the thickness of their preferred relatively thin sheet material composition. Such an arrangement minimizes the interference of the tabs 26 with other components of the apparatus.

In order to substantially constrain the bending deformation of the one-piece body 16 to the general area of the apex portion 18, the appropriate portions of the one-piece body 16 (or that of the other embodiments of the present invention) can be provided with optional stiffening ribs 36, as shown for purposes of illustration on the attachment members 20 in the embodiment illustrated in FIGS. 1 through 4. Similarly, stiffening grooves (or ribs) 39 and 41 are preferably provided in the tabs 24 and 26, respectively, in order to substantially eliminate or minimize bending of the tabs as the attachment members 20 are forcibly spread during installation. Such grooves (or ribs) 39 and 41 also strengthen the tabs to resist pull-out or push-out forces. Such stiffening grooves (or ribs) can also be provided in the tab or other portions of the one-piece bodies in any of the embodiments of the present invention. Furthermore, if desired in a particular installation, the tabs 26 (or the corresponding tabs in any of the other embodiments of the present invention) can also alternatively and optionally be provided with barb-like members that interlockingly engage or pierce into the second opposite side of the panel structure 14.

FIG. 4 illustrates an optional variation in the application of the closure device 10, wherein the one-piece body 16 is installed in conjunction with an optional exemplary sealing member 38 interposed between the one-piece body 16 and the portion of the panel structure 14 generally surrounding and adjacent to the aperture 12, with the lateral portions 22 of the attachment members 20 gripping the first side of the panel structure 20 through the sealing member 38. The sealing member 38 includes a number of slits or openings 40 corresponding to the number of attachment members 20 for receiving and tightly sealingly engaging the leg portions 30 therethrough. It should be noted that the sealing member 38 can optionally be a plate-like sealing member composed of an elastomer or other known materials for sealingly covering or closing substantially all of the aperture 12, or alternatively an annular sealing member interposed between the one-piece body 16 and the panel structure 14 in the annular region surrounding the aperture 12. In the later case, the annular sealing member can alternatively be an elastomeric composition, a sealing foam-type material, or virtually any other type of suitable sealing or adhesive bonding means known to those skilled in the sealing art.

Furthermore, it should be recognized that a sealing member can also be bonded, adhered, or otherwise secured to the external side of the one-piece body 16, opposite from the side of the body oriented toward the panel structure, if a sealing engagement with other components is also desired. Such an external sealing member can be provided on the external side of the body 16 in a suitable application regardless of whether or not a sealing or adhesive bonding means is interposed between the body 16 and the panel structure 14.

If desired or deemed necessary in a particular application, the apex portion 18 can be more extensive than the "peaked" or ridge-like configuration shown in FIGS. 1 through 4, and can include a generally flat plateau-like area in which the bending deformation is to primarily occur. In such a case, stiffening ribs generally similar to the stiffening ribs 36 in the attachment members 20 can also be provided in the generally flat, plateau-like apex portion in order to substantially confine the bending deformation to a desired portion thereof.

It should also be noted that in the embodiment of the closure device 10 illustrated in FIGS. 1 through 4, or in any of the other embodiments illustrated in the drawings and discussed below, the one-piece body 16 can have a relatively narrow, generally strap-like configuration for partially closing or covering the aperture 12, or alternatively can be more extensively configured so as to substantially close or cover the entire aperture 12. Either of such alternate variations of the one-piece body 16 may be used either alone or can be used in conjunction with a sealing or adhesive bonding means, such as those discussed above, where a substantially fluid-tight closure of the aperture 12 is either desired or required in a particular application, or alternatively where a temporary support or locating means is desired or required until the sealing or adhesive bonding means is heat activated, bonded, secured or set in place.

FIG. 5 illustrates an alternate embodiment of the present invention, wherein the closure device 10b includes a one-piece body portion 16b preferably having at least a pair of tabs 26b disposed on opposite lateral sides of a tab 24b. The tabs 26b have a slightly curved shaped and a lip portion 27b, and the tabs 24b also have a lip portion 25b, similar to those discussed above in connection with FIGS. 1 through 4. In the embodiment illustrated in FIG. 5, the pair of tabs 26b are adapted to grippingly engage the second opposite side of the panel structure 14 when the one-piece body 16 is inserted into the aperture 12 from the first side of the panel structure and forcibly deformed into said gripping engagement therewith.

The provision of a plurality of tabs 26b on the one-piece body 16b for grippingly engaging the second opposite side of the panel structure 14 allows for an increased strength or resistance to push-out forces, such as those indicated by force arrow 42 in FIG. 5, tending to forcibly push the one-piece body 16b out of the aperture 12 from the second opposite side of the panel structure 14. It should be noted that any number of the tabs 24b can also be included for gripping the first side of the panel structure 14 if desired or required in a particular application. Furthermore, the number and width of the tabs 24b and 26b, as well as the thickness of the one-piece body material and the provision of stiffening grooves (or ribs) 39b and 41b, respectively, depend in a given application upon the desired strength or resistance to pull-out or push-out forces that the closure device is expected to encounter.

The particular tab arrangement and configuration on the outer end of the attachment member 20b illustrated in FIG. 5 can be provided at the outer ends of all of the attachment members in a particular embodiment of the closure device, or alternatively, one or more of the attachment members can have the outer end arrangement and configuration illustrated in FIG. 5 while one or more of the other attachment members of the one-piece body can have one of the other outer end arrangements and configurations illustrated in the other Figures of the drawings. Finally, it should also be recognized that the one-piece body 16b illustrated in FIG. 5 can also be equipped with a sealing member, which may have any of the configurations and/or compositions discussed above. However, as with the other embodiments of the invention, the tabs 26c preferably protrude from the second opposite side of the panel structure 14 (or any part thereof) generally not substantially more than their own thickness as discussed above in connection with the embodiment shown in FIGS. 1 through 4.

FIGS. 6 and 7 illustrate still another embodiment of the present invention, wherein closure device 10c includes a one-piece body portion 16c including a number of outer attachment members 20c. Each of the attachment members 20c includes at least one tab portion 26c at its outer end. The tab portions 26c are adpated to be received within either the slotted opening 46 illustrated in FIG. 6, or the slotted opening 48 illustrated in FIG. 7, both of which extend through their respective panel structures and are located generally adjacent the aperture 12.

The one-piece body 16c of FIGS. 6 and 7 is adapted to be forcibly deformed and generally flattened in a direction toward the aperture 12, as described above, in order to cause the tabs 26c on the outer ends of the attachment members 20c to grippingly engage the second opposite side of the panel structure 14. When the outer ends of the attachment members 20c are in such gripping relationship with the panel structure 14 surrounding the aperture 12, the first side of the panel structure 14 is preferably gripped by the outer end portion of the attachment members 20c generally adjacent the tabs 26c. As was previously discussed above in connection with the other embodiments of the invention, the one-piece body 16 may be configured in a relatively narrow strap-like shape or in a more extensive configuration adapted to cover substantially all of the aperture 12. Furthermore, the one-piece body 16c illustrated in FIGS. 6 and 7 may be used either alone or in conjunction with any of the sealing members or the sealing or adhesive bonding means discussed above, and the tabs 26c are preferably slightly curved in shape and have lip portions 27c as discussed above.

In FIG. 6, the tabs 26c are grippingly received in a corresponding number of slotted openings 46 generally adjacent to, and contiguous with, the aperture 12 when the one-piece body is forcibly deformed as described above. Preferably when the attachment members 20c are in such gripping relationship with the panel structure 14, the tabs 26c grip the second opposite side of the panel structure 14, and the lateral portions 44 of the attachment members 20c grip the first side of the panel structure, either in direct contact or acting through a sealing means as described above.

In FIG. 7, the tabs 26c are similarly grippingly received in a corresponding number of slotted openings 48 generally adjacent to, but separate from the aperture 12 when the one-piece body is deformably installed therein. Preferably, in such installation, the tabs 26c grip the second opposite side of the panel structure 14, and the lateral portions 44 grip the first side of the panel structure, either in direct contact or acting through a sealing means as described above. In either FIGS. 6 or 7, however, the tabs 26c preferably protrude from the panel structure 14 (or any part thereof) generally not substantially more than their own thickness as described above.

FIG. 8 illustrates still another embodiment of the closure device 10d having a one-piece body 16d generally similar to the body 16c of FIGS. 6 and 7. The one-piece body 16c, however, includes at least one integral support member 52 extending in a generally lateral or radial outward direction to abuttingly engage the portion of the panel structure 14 generally adjacent the aperture 12, either in direct contact therewith or with a sealing means (such as sealing member 38d) interposed therebetween. The support members 52 function to support and stiffen the one-piece body 16 and/or the sealing member 38 and accordingly can also include stiffening ribs 36 therein, similar to the stiffening ribs 36 formed in the attachment members 20d. The support members 52 can also function to limit the final installed position of the one-piece body relative to the aperture to a desired position, e.g. on the first side of panel structure 14, into the aperture 12, or even slightly on the second opposite side of the panel structure 14. It should be noted that the integral support members 52 shown in FIG. 8 can be incorporated with any of the other alternate embodiments, versions or features of the present invention described herein and shown for purposes of illustration in the drawings.

FIGS. 9 illustrates still another optional feature of the present invention that can be employed in conjunction with any of the various alternate features and embodiments discussed herein. The one-piece body 16e is recessed or stepped, such as indicated by reference numeral 56, for purposes of stiffening the one-piece body or to avoid interference with other components located near the panel structure. It should be noted that if support members, such as those indicated by reference numeral 52, in FIG. 8 are employed in the device illustrated in FIG. 9, such support members can also be similarly recessed or stopped. The one-piece body 16e preferably protrudes from the first side of the panel structure 14 (or any part thereof) generally not substantially more than the thickness of the relatively thin tabs 24e and the sealing member 38e, if used. Similarly, as discussed above, the body 16e protrudes from the second side of the panel structure 14 (or any part thereof) generally not substantially more than the thickness of the relatively thin tab 26e.

FIGS. 10 and 11 illustrate that virtually any number (i.e., two, three or more) of the exemplary attachment members 20f may be provided in a generally "spider-shaped" one-piece body 16. The inclusion of several of such attachment members 20f can be desirable and advantageous in various installations where a relatively large aperture 12 is to be covered or closed or where a high degree of push-out or pull-out strength is desired, for example.

The foregoing discussion discloses and describes exemplary embodiments of the present invention. One skilled in the art will readily recognize from such discussion that various changes, modifications and variations may be made therein without departing from the spirit and scope of the invention as defined in the following claims.

We claim:

1. A closure device for at least partially covering or closing an aperture in a panel structure or the like, said closure device comprising a relatively stiff but malleable one-piece body including a number of integral outer attachment members, at least a portion of each of said outer attachment members loosely and abuttingly engaging a portion of said panel structure generally adjacent said aperture and supporting the remainder of said closure device in a generally arched configuration spaced apart from said aperture when said closure device is inserted into said aperture from a first side of said panel structure, said closure device being adapted to receive a force exerted thereon in a direction generally toward said aperture, at least a portion of said closure device deforming toward said aperture and said outer members moving outwardly into a relatively tight gripping relationship with said portions of said panel structure generally adjacent said aperture in response to said force, said one-piece body thereby at least partially closing said aperture and being relatively securely attached to said panel structure.

2. A closure device according to claim 1, wherein said one-piece body grippingly engages both said first side and a second opposite side of said panel structure generally adjacent said aperture.

3. A closure device according to claim 1, wherein at least said integral outer portions of said body are formed from a sheet material and protrude from a second opposite side of said panel structure a distance not substantially more than the thickness of said sheet material when in said gripping engagement with said panel structure.

4. A closure device according to claim 1, wherein said integral outer portions each include at least one tab thereon, said tab engaging a second opposite side of said panel structure when said integral outer portions grippingly engage said panel structure.

5. A closure device according to claim 4, wherein each of said integral outer portions includes at least one second tab thereon, said second tab engaging said first side of said panel structure when said integral outer portions grippingly engage said panel structure.

6. A closure device according to claim 1, wherein said integral outer portions each include at least one integral tab thereon, at least said tab being formed from a relatively thin sheet material, said panel structure including a number of slots therein generally adjacent but spaced apart from said aperture, said slots being adapted to receive said tabs extending therethrough, said tabs protruding from a second opposite side of said panel structure a distance not substantially more than the thickness of said sheet material.

7. A closure device according to claim 1, wherein said one-piece body covers substantially the entire aperture and at least partially overlaps the panel structure adjacent said aperture.

8. A closure device according to claim 1, further comprising sealing means interposed between said one-piece body and said first side of said panel structure, said one-piece body urging said sealing means into a sealing engagement with said panel structure surrounding said aperture.

9. A closure device according to claim 8, wherein said sealing means covers substantially the entire aperture and at least partially overlaps the panel structure adjacent said aperture.

10. A closure device according to claim 8, wherein said one-piece body covers substantially the entire aperture and at least partially overlaps the panel structure adjacent said aperture.

11. A closure device according to claim 10, wherein said sealing means extends around an annular region surrounding said aperture.

12. A closure device according to claim 11, wherein said sealing means covers substantially the entire aperture and at least partially overlaps the panel structure adjacent said aperture.

13. A closure device for closing or covering an aperture in a panel structure or the like, said closure device comprising a relatively stiff but malleable one-piece body including a generally intermediate apex portion and at least a pair of attachment portions integrally formed with said apex portion and extending generally outwardly therefrom, said attachment portions being in a generally angular relationship with one another and supporting said apex portion in a spaced relationship from said aperture when said one-piece body is insertably placed into said aperture from a first side of said panel structure with the outer ends of said attachment portions relatively loosely engaging a portion of said panel structure generally adjacent said aperture, said one-piece body being adapted to be forcibly urged generally toward said aperture in order to forcibly deform said at least a portion of one-piece body and to forcibly urge said outer ends of said attachment portions into a relatively tight gripping engagement with a portion of said panel structure generally adjacent said aperture, said outer ends each having at least a pair of tabs thereon, said pair of tabs on each of said outer ends gripping opposite sides of said panel structure when said one-piece body is forcibly urged toward said aperture, the tabs on the second opposite side of said panel structure protruding therefrom generally no more than their own thicknesses.

14. A closure device according to claim 13, wherein at least one of said outer ends includes a plurality of said tabs thereon for gripping said second side of said panel structure, said plurality of tabs being adapted to resist push-out forces directed generally from said second side toward said first side of said panel structure.

15. A closure device according to claim 13, at least one of said outer ends includes a plurality of said tabs thereon for gripping said first side of said panel structure.

16. A closure device according to claim 13, wherein said one-piece body covers substantially the entire aperture and at least partially overlaps the panel structure adjacent said aperture.

17. A closure device according to claim 13, further comprising sealing means interposed between said one-piece body and said first side of said panel structure, said one-piece body urging said sealing means into a sealing engagement with said panel structure surrounding said aperture.

18. A closure device according to claim 17, wherein said sealing means covers substantially the entire aperture and at least partially overlaps the panel structure adjacent said aperture.

19. A closure device according to claim 17, wherein said one-piece body covers substantially the entire aperture and at least partially overlaps the panel structure adjacent said aperture.

20. A closure device according to claim 19, wherein said sealing means extends around an annular region surrounding said aperture.

21. A closure device according to claim 20, wherein said sealing means covers substantially the entire aperture and at least partially overlaps the panel structure adjacent said aperture.

22. A closure device according to claim 13, wherein said attachment portions include stiffening means integrally formed therein for substantially minimizing the bending of said attachment portions when said one-piece body is forcibly urged generally toward said aperture in order to substantially confine said deformation of said one-piece body to said apex portion.

23. A closure device according to claim 13, wherein each of said tabs includes stiffening means integrally formed therein for substantially minimizing the bending of said tabs when said one-piece body is forcibly urged generally toward said aperture.

24. A closure device according to claim 13, wherein said one-piece body is integrally formed from a relatively thin sheet material.

25. A closure device for closing or covering an aperture in a panel structure or the like, said panel structure having at least a pair of slot openings extending therethrough generally adjacent said aperture, said closure device comprising a relatively stiff but malleable one-piece body including a generally intermediate apex portion and at least a pair of attachment portions integrally formed with said apex portion and extending generally outwardly therefrom, said attachment portions each having at least one tab on its outer end, said attachment portions further being in a generally angular relationship with one another and supporting said apex portion in a spaced relationship from said aperture when said one-piece body is insertably placed into said aperture from a first side of said panel structure with the tabs on said outer ends of said attachment portions relatively loosely extending into said slot openings in said panel structure, said one-piece body being adapted to be forcibly urged generally toward said aperture in order to forcibly deform at least a portion of said one-piece body and to forcibly urge said outer ends of said attachment portions into a relatively tight gripping engagement with said panel structure, said tabs on said outer ends and the remainder of said attachment portions gripping opposite sides of said panel structure generally adjacent said slots therein and said aperture when said one-piece body is forcibly urged toward said aperture, said tabs protruding from the second opposite side of said panel structure generally no more than their own thicknesses.

26. A closure device according to claim 25, wherein said one-piece body covers substantially the entire aperture and at least partially overlaps the panel structure adjacent said aperture.

27. A closure device according to claim 25, further comprising sealing means interposed between said one-piece body and said first side of said panel structure, said one-piece body urging said sealing means into a sealing engagement with said panel structure surrounding said aperture.

28. A closure device according to claim 27, wherein said sealing means covers substantially the entire aperture and at least partially overlaps the panel structure adjacent said aperture.

29. A closure device according to claim 27, wherein said one-piece body covers substantially the entire aperture and at least partially overlaps the panel structure adjacent said aperture.

30. A closure device according to claim 29, wherein said sealing means extends around an annular region surrounding said aperture.

31. A closure device according to claim 30, wherein said sealing means covers substantially the entire aperture and at least partially overlaps the panel structure adjacent said aperture.

32. A closure device according to claim 25, wherein said attachment portions include stiffening means integrally formed therein for substantially minimizing the bending of said attachment portions when said one-piece body is forcibly urged generally toward said aperture in order to substantially confine said deformation of said one-piece body to said apex portion.

33. A closure device according to claim 25, wherein each of said tabs includes stiffening means integrally formed therein for substantially minimizing the bending of said tabs when said one-piece body is forcibly urged generally toward said aperture.

34. A closure device according to claim 25, wherein said one-piece body is integrally formed from a relatively thin sheet material.

35. A device for at least partially covering or closing an aperture in a panel structure or the like and for at least temporarily supporting and locating an adhesive sealing means over said aperture until said sealing means is activated and bonded in place, said closure device comprising a relatively stiff but malleable one-piece body including a number of integral outer attachment members, at least a portion of each of said outer attachment members loosely and abuttingly engaging a portion of said panel structure generally adjacent said aperture and supporting the remainder of said closure device in a generally arched configuration spaced apart from said aperture when said closure device is inserted into said aperture from a first side of said panel structure, said closure device being adapted to receive a force exerted thereon in a direction generally toward said aperture, at least a portion of said closure device deforming toward said aperture and said outer members moving outwardly into a relatively tight gripping relationship with said portions of said panel structure generally adjacent said aperture in response to said force, said one-piece body thereby at least partially closing said aperture and being relatively securely attached to said panel structure, sealing means being interposed between said one-piece body and said first side of said panel structure, said one-piece body urging said sealing means into a sealing engagement with said panel structure surrounding said aperture during the activation and bonding of said sealing means therewith.

36. A device according to claim 35, wherein said integral outer portions each include at least one tab thereon, said tab engaging a second opposite side of said panel structure when said integral outer portions grippingly engage said panel structure.

37. A device according to claim 36, wherein each of said integral outer portions includes at least one second tab thereon, said second tab engaging said first side of said panel structure when said integral outer portions grippingly engage said panel structure.

38. A device according to claim 35, wherein said sealing means covers substantially the entire aperture and at least partially overlaps the panel structure adjacent said aperture.

39. A device according to claim 35, wherein said one-piece body covers substantially the entire aperture and at least partially overlaps the panel structure adjacent said aperture.

40. A device according to claim 39, wherein said sealing means extends around an annular region surrounding said aperture.

41. A device according to claim 40, wherein said sealing means covers substantially the entire aperture and at least partially overlaps the panel structure adjacent said aperture.

* * * * *